(12) United States Patent (10) Patent No.: US 12,576,807 B2

Rahman et al. (45) Date of Patent: Mar. 17, 2026

(54) VEHICLE HOOD HINGE ASSEMBLY

(71) Applicant: Tesla, Inc., Austin, TX (US)

(72) Inventors: Rafath Rahman, Tracy, CA (US);
Jarad Hutchinson, Grosse Pointe, MI
(US); Norman Tieu, Sewell, NJ (US);
Tyron François, Montreal (CA); **Daniel
Myles Wood**, Livermore, CA (US)

(73) Assignee: Tesla, Inc., Austin, TX (US)

( * ) Notice: Subject to any disclaimer, the term of this
patent is extended or adjusted under 35
U.S.C. 154(b) by 0 days.

(21) Appl. No.: 19/173,138

(22) Filed: Apr. 8, 2025

(65) Prior Publication Data

US 2025/0229743 A1 Jul. 17, 2025

Related U.S. Application Data

(63) Continuation of application No. 18/292,516, filed as
application No. PCT/US2022/043248 on Sep. 12,
2022, now Pat. No. 12,337,790.

(Continued)

(51) Int. Cl.
*B60R 21/38* (2011.01)
*E05F 15/75* (2015.01)

(52) U.S. Cl.
CPC .............. *B60R 21/38* (2013.01); *E05F 15/75*
(2015.01); *E05Y 2400/44* (2013.01); *E05Y*
*2900/536* (2013.01)

(58) Field of Classification Search
CPC ................ B60R 21/38; B60R 21/0134; B60R
2021/01252; E05F 15/75; E05Y 2400/44;
E05Y 2900/536; E05D 3/145
See application file for complete search history.

(56) References Cited

U.S. PATENT DOCUMENTS 7,461,858 B2 * 12/2008 Hirata ................. B60R 21/2338
280/730.2
7,543,677 B2 * 6/2009 Igawa ................. B60R 21/0134
280/735

(Continued)

FOREIGN PATENT DOCUMENTS

CA 2657345 A1 * 1/2008 ............. B60R 21/34
CN 1352605 A * 6/2002 ............. B60R 21/34

(Continued)

OTHER PUBLICATIONS

"U.S. Appl. No. 18/292,516, Non Final Office Action mailed Sep.
6, 2024", 8 pgs.
"U.S. Appl. No. 18/292,516, Notice of Allowance mailed Jan. 8,
2025", 6 pgs.
"U.S. Appl. No. 18/292,516, Response filed Nov. 22, 2024 to Non
Final Office Action mailed Sep. 6, 2024", 9 pgs.

(Continued)

*Primary Examiner* — Drew J Brown
(74) *Attorney, Agent, or Firm* — Schwegman Lundberg &
Woessner, P.A.

(57) ABSTRACT

A hinge assembly is provided to lift a hood of a vehicle
relative to a vehicle body in anticipation of, during, or right
after a collision has occurred to cushion contact with a
pedestrian. The hood selectively covers a compartment of
the vehicle when in a secured position. The hinge assembly
includes a hinge configured to guide the hood from the
secured position to both of an open position or to a pedes-
trian deployment position relative to the vehicle body. An
actuator moves the hood from the secured position to the
pedestrian deployment position. A controller controls the
actuator based at least in part on a characteristic of the
pedestrian.

20 Claims, 15 Drawing Sheets

Related U.S. Application Data

(60) Provisional application No. 63/261,143, filed on Sep. 13, 2021.

(56) References Cited

U.S. PATENT DOCUMENTS

| | | | | | |
|---|---|---|---|---|---|
| 9,573,560 | B1 * | 2/2017 | Narita | ................... | B60R 21/26 |
| 12,337,790 | B2 | 6/2025 | Rahman et al. | | |
| 2008/0093150 | A1 * | 4/2008 | Schramm | ............... | B60R 21/38 |
| | | | | | 180/274 |
| 2016/0059823 | A1 * | 3/2016 | Jayasuriya | ............. | B60R 21/34 |
| | | | | | 180/274 |
| 2024/0042959 | A1 * | 2/2024 | Krishnamoorthy | ..... | B60R 21/38 |

FOREIGN PATENT DOCUMENTS

| | | | | | | |
|---|---|---|---|---|---|---|
| CN | 118004082 | A | * | 5/2024 | ............ | B60R 21/01 |
| DE | 19922455 | C1 | * | 10/2000 | ............ | B62D 25/12 |
| DE | 10234897 | A1 | * | 2/2004 | ............ | B60R 21/38 |
| DE | 102004012478 | A1 | * | 10/2004 | ........ | B60R 21/0132 |
| DE | 102019117840 | A1 | * | 1/2020 | ............ | B60R 19/52 |
| EP | 1400416 | A1 | * | 3/2004 | ............ | B60R 21/38 |
| FR | 3024098 | A1 | * | 1/2016 | ............ | B60R 21/38 |
| JP | 2016128293 | A | * | 7/2016 | ............ | B60R 21/38 |
| KR | 20020030931 | A | * | 4/2002 | ............ | B60R 21/38 |
| WO | WO-2010070303 | A1 | * | 6/2010 | ............ | B60R 21/38 |
| WO | WO-2020005554 | A1 | * | 1/2020 | ....... | B32B 17/10761 |

OTHER PUBLICATIONS

"U.S. Appl. No. 18/292,516, Supplemental Notice of Allowability mailed Apr. 4, 2025", 3 pgs.

"U.S. Appl. No. 18/292,516, Preliminary Amendment filed Jan. 26, 2024", 7 pgs.

"European Application Serial No. 22783625.1, Communication Pursuant to Article 94(3) EPC mailed Jul. 8, 2025", 8 pgs.

"European Application Serial No. 22783625.1, Response filed Sep. 30, 2025 to Communication Pursuant to Article 94(3) EPC mailed Jul. 8, 2025", w English Claims, 9 pgs.

"European Application Serial No. 22783625.1, Communication Pursuant to Article 94(3) EPC mailed Apr. 7, 2025", 7 pgs.

"U.S. Appl. No. 18/292,516, Supplemental Notice of Allowability mailed Apr. 11, 2025", 3 pgs.

"U.S. Appl. No. 18/292,516, Supplemental Notice of Allowability mailed May 19, 2025", 4 pgs.

"European Application Serial No. 22783625.1, Response filed Jun. 27, 2025 to Communication Pursuant to Article 94(3) EPC mailed Apr. 7, 2025", 9 pgs.

"European Application Serial No. 22783625.1, Communication Pursuant to Article 943 EPC mailed Oct. 10, 2025", 4 pgs.

"European Application Serial No. 22783625.1, Response filed Nov. 11, 2025 to Communication Pursuant to Article 943 EPC mailed Oct. 10, 2025", W English Claims, 9 pgs.

"European Application Serial No. 22783625.1, Communication Pursuant to Article 943 EPC mailed Jan. 5, 2026", 9 pgs.

* cited by examiner

DEPLOYED HOOD (UNLOADED)
DEPLOYED HOOD WITH BODY LOADING
UNDEPLOYED HOOD

VEHICLE HOOD HINGE ASSEMBLY

REFERENCE TO RELATED APPLICATIONS

This application is a continuation of and claims the benefit of priority of U.S. application Ser. No. 18/292,516, filed Jan. 26, 2024, which claims the benefit of U.S. Provisional Application No. 63/261,143, filed Sep. 13, 2021, the entire disclosure of each of which is hereby incorporated by reference in its entirety.

TECHNICAL FIELD

This application relates to a safety system for a vehicle. More particularly, the safety system controls positioning of a hood of the vehicle to absorb energy and protect pedestrians in the event of a collision.

BACKGROUND

Generally described, a variety of vehicles, such as electric vehicles, combustion engine vehicles, hybrid vehicles, etc., can be configured with a hood, e.g., a front hood. More specifically, a latch can be configured to secure the hood in place when the vehicle is moving while allowing the user to unlatch the hood to access a compartment below the hood when the vehicle is stationary. With respect to an imminent or occurred collision between a front of the vehicle and a pedestrian, the pedestrian may contact not only a front bumper but also the front hood. Protective structures and methods may be incorporated into the vehicle to protect the pedestrian.

SUMMARY

An aspect is directed to a hinge assembly configured to lift a hood of a vehicle relative to a vehicle body in anticipation of, during, or right after a collision has occurred to cushion contact with a pedestrian. The hood can be configured to selectively cover a compartment of the vehicle when in a secured position. The hinge assembly comprises a hinge configured to guide the hood from the secured position to both of an open position or to at least a first pedestrian deployment position relative to the vehicle body, an actuator configured to move the hood from the secured position to at least the first pedestrian deployment position, a sensor configured to send a signal indicative of the collision, and a controller configured to receive the signal and trigger the actuator.

A variation of the aspect above is, wherein the hinge is further configured to guide the hood from the secured position to both the first pedestrian deployment position and a second pedestrian deployment position, the second pedestrian deployment position being different than the first pedestrian deployment position.

A variation of the aspect above is, wherein the first pedestrian deployment position corresponds to a first height from the vehicle body, and wherein the second pedestrian deployment position corresponds to a second height from the vehicle body.

A variation of the aspect above is, wherein the actuator is further configured to move the hood from the secured position to the first pedestrian deployment position in a first time frame.

A variation of the aspect above is, wherein the actuator is further configured to move the hood from the secured position to the first pedestrian deployment position in a second time frame, the second time frame being different than the first time frame.

A variation of the aspect above is, wherein the actuator is a multi-stage actuator.

A variation of the aspect above is, wherein the sensor is an optical sensor.

A variation of the aspect above is, wherein the sensor is passive.

A variation of the aspect above is, wherein the sensor is active.

A variation of the aspect above is, wherein the sensor is a photodetector.

A variation of the aspect above is, wherein the sensor is infrared.

A variation of the aspect above is, wherein the sensor is a camera.

A variation of the aspect above is, wherein the sensor is LiDAR.

A variation of the aspect above is, wherein the sensor is radar.

A variation of the aspect above is, wherein the sensor is an accelerometer.

A variation of the aspect above is, wherein the sensor is a pressure sensor.

A variation of the aspect above is, wherein the sensor is configured to sense a general size of the pedestrian.

A variation of the aspect above is, wherein the sensor is configured to sense both a first size of the pedestrian or a second size of the pedestrian, the second size being different than the first size, and wherein the signal is indicative of whether the pedestrian is the first size or the second size.

A variation of the aspect above is, wherein the sensor is configured to sense contact of the pedestrian with the vehicle.

A variation of the aspect above is, wherein the sensor is configured to sense imminent contact of the pedestrian with the vehicle.

A variation of the aspect above is, wherein the controller is configured to transmit both a first trigger signal or a second trigger signal to the actuator depending on a characteristic of the pedestrian.

A variation of the aspect above is, wherein a rate at which the hood moves to the first pedestrian deployment position depends on whether the controller transmits the first trigger signal or the second trigger signal.

A variation of the aspect above is, wherein the characteristic of the pedestrian includes at least one of a height, a width, a weight, a position of the pedestrian relative to the vehicle, or an orientation of the pedestrian relative to the vehicle.

Another aspect is a hinge assembly configured to lift a hood of a vehicle relative to a vehicle body in anticipation of, during, or right after a collision has occurred to cushion contact with a pedestrian. The hood can be configured to selectively cover a compartment of the vehicle when in a secured position. The hinge assembly comprises a hinge configured to guide the hood from the secured position to both of an open position or to a pedestrian deployment position relative to the vehicle body, an actuator configured to move the hood from the secured position to the pedestrian deployment position, and a controller configured to control the actuator based at least in part on a characteristic of the pedestrian.

A variation of the aspect above further comprises a sensor configured to send a signal indicative of the collision to the controller.

A variation of the aspect above further comprises a sensor configured to send a signal indicative of the characteristic of the pedestrian to the controller.

A variation of the aspect above is, wherein the actuator and the controller together are a unitary structure.

Another aspect is a method for lifting a hood of a vehicle relative to a vehicle body in anticipation of, during, or right after a collision has occurred to cushion contact with a pedestrian. The hood being configured to selectively cover a compartment of the vehicle when in a secured position. The method comprises receiving a signal indicative of a pedestrian collision, receiving a signal related to a vehicle parameter, receiving a signal indicative of one or more pedestrian characteristics, determining a pedestrian deployment position for the hood and/or a time frame for moving the hood to the pedestrian deployment position based on one or more of the received signals, and transmitting information or a control signal that causes the hood to move to the pedestrian deployment position within the time frame.

Another aspect is a vehicle hood assembly that comprises a hood configured to cover a compartment of a vehicle body, the hood being movable between a first position and a second position, a hinge configured to guide the hood from the first position to both of the second position and a pedestrian deployment position relative to the vehicle body, an actuator configured to move the hinge, a sensor configured to send a signal indicative of a collision with a pedestrian, and a controller configured to control the actuator based at least in part on the signal.

A variation of the aspect above is, wherein the sensor is configured to send the signal before the pedestrian contacts the vehicle body.

A variation of the aspect above is, wherein the sensor is configured to send the signal after the pedestrian contacts the vehicle body.

A variation of the aspect above is, wherein the sensor is configured to send the signal before the pedestrian contacts the hood.

A variation of the aspect above is, wherein the sensor is configured to sense a general size of the pedestrian.

A variation of the aspect above is, wherein the sensor is configured to sense both a first size of the pedestrian or a second size of the pedestrian, the second size being different than the first size, and wherein the signal is indicative of whether the pedestrian is the first size or the second size.

A variation of the aspect above is, wherein the sensor is an accelerometer.

A variation of the aspect above is, wherein the sensor is a pressure sensor.

A variation of the aspect above is, wherein the sensor is a camera.

A variation of the aspect above is, wherein the sensor is LiDAR.

A variation of the aspect above is, wherein the sensor is radar.

Another aspect is a method for lifting a hood of a vehicle relative to a vehicle body in anticipation of, during, or right after a collision has occurred to cushion contact with a pedestrian. The hood being configured to rotate in a first direction from a secured position over a compartment of the vehicle to an open position allowing a user access to the compartment. The method comprises receiving a signal indicative of a pedestrian collision and rotating at least a portion of the hood in a second direction that is opposite of the first direction to a pedestrian deployment position in response to the signal.

A variation of the aspect above is, wherein the signal is indicative of a vehicle parameter.

A variation of the aspect above is, wherein the signal is indicative of one or more pedestrian characteristics.

A variation of the aspect above further comprises determining the pedestrian deployment position for the hood and/or a time frame for moving the hood to the pedestrian deployment position based at least in part on the signal.

A variation of the aspect above further comprises engaging a tab in a slot when the hood reaches the pedestrian deployment position.

Another aspect is a hinge assembly configured to lift a hood of a vehicle to a pedestrian deployment position relative to a vehicle body in anticipation of, during, or right after a collision has occurred to cushion contact with a pedestrian. The hood being configured to selectively cover a compartment of the vehicle when in a secured position. The hinge assembly comprises a hood bracket configured to be secured to the hood and comprising a first engagement structure, a body bracket configured to be secured to the vehicle body, one or more links coupled to the body bracket, and a hood link coupled to the one or more links and the hood bracket, the hood link comprising a second engagement structure configured to be disengaged from the first engagement structure when the hood is in the secured position and engaged with the first engagement structure when the hood is in the pedestrian deployment position.

A variation of the aspect above is, wherein one of the first and second engagement structures is a tab and the other one of the first and second engagement structures is a slot.

BRIEF DESCRIPTION OF THE DRAWINGS

The present inventions are described with reference to the accompanying drawings, in which like reference characters reference like elements, and wherein.

DETAILED DESCRIPTION

Generally described, one or more aspects of the present disclosure relate to pedestrian safety systems. In certain embodiments, the disclosure relates to a vehicle hood hinge system that can include a locking and deployment feature for pedestrian protection. Pedestrians include humans regardless of the humans mode of transportation (e.g., walking, biking, skateboard, etc.). The system can further include one or more sensors configured to provide one or more characteristics of the pedestrian to a controller. The controller can determine an actuation profile that controls positioning of the hood and a time frame for positioning the hood to increase the level of safety provided to the pedestrian in the event of a collision.

In certain embodiments, the vehicle hood hinge system is an active hood hinge which deploys upon actuation by an actuator. In certain embodiments, this occurs when a pedestrian impacts the front end of the vehicle. Because of this deployment, the hood is in a higher position as compared to the position of the hood when closed or in a secured position when the head of the pedestrian impacts the hood. The higher position provides a cushioning effect and softens the impact of the head against the vehicle which reduces a head injury criterion ("HIC") score for the impact. In certain embodiments the vehicle hood hinge system comprises a mechanism to robustly hold the hinge in its pedestrian deployment position for the time duration of the head impact event. In certain embodiments, the mechanism includes an actuator which moves the hood to the higher position along with one or more securement structures. Exemplary securement structures include one or more tabs and corresponding slots and/or a stop pin and corresponding slot.

In certain embodiments, the vehicle hood hinge system employs a specific trigger signal or actuation profile that takes into account one or more characteristics of the pedestrian to enhance the level of safety provided by the system. For example, in certain embodiments, the trigger signal places the hood in one location of a plurality of locations and/or within a time frame of a plurality of time frames that corresponds to an actuation profile to further enhance the level of safety provided by the system for the specific pedestrian. By customizing the position and/or time frame the head injury criterion ("HIC") score can be further reduced as compared to providing a generic actuation profile.

Figure 1:
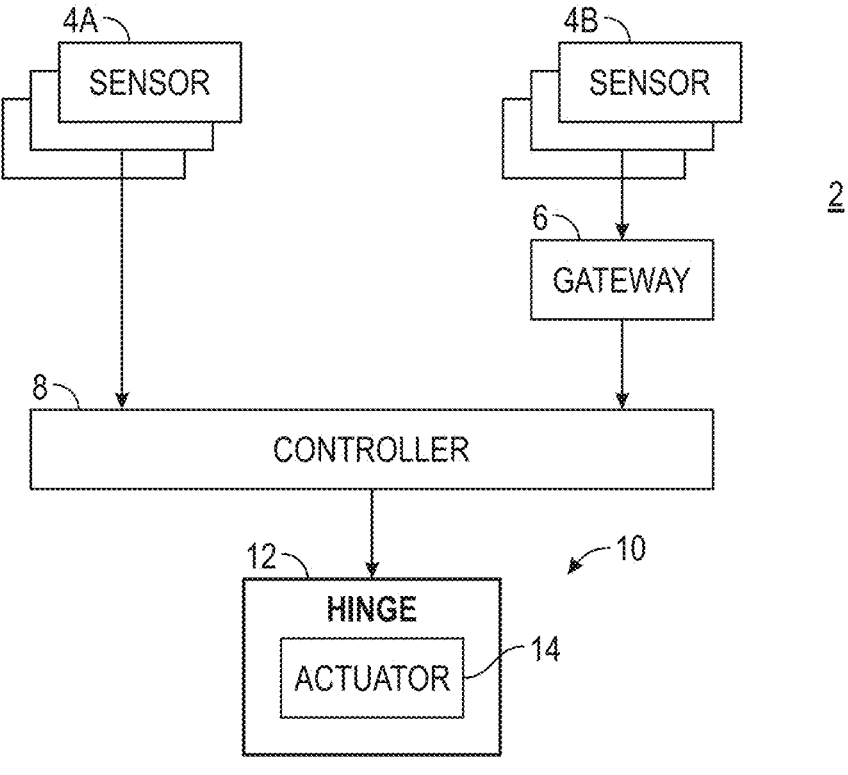
FIG. 1 is a block diagram of a system including a controller and a hinge assembly for a vehicle that provides pedestrian safety.
Figure 2A:
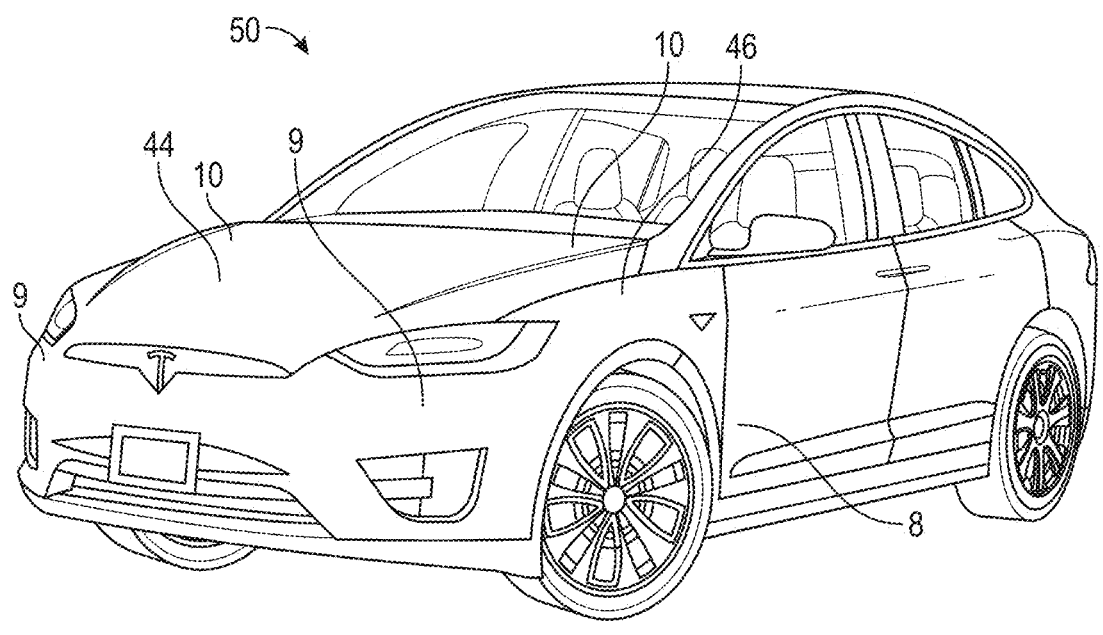
FIGS. 2A-B are exemplary illustrations of a vehicle and an exploded view of a bumper that includes the system of FIG. 1 and a combination of sensors.
Figure 2B:
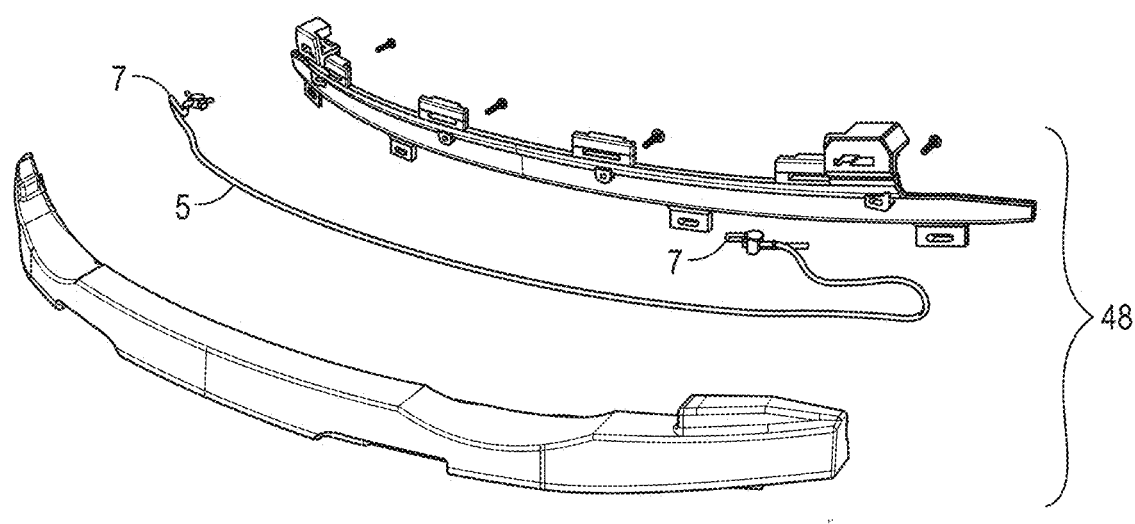
Figure 3A:
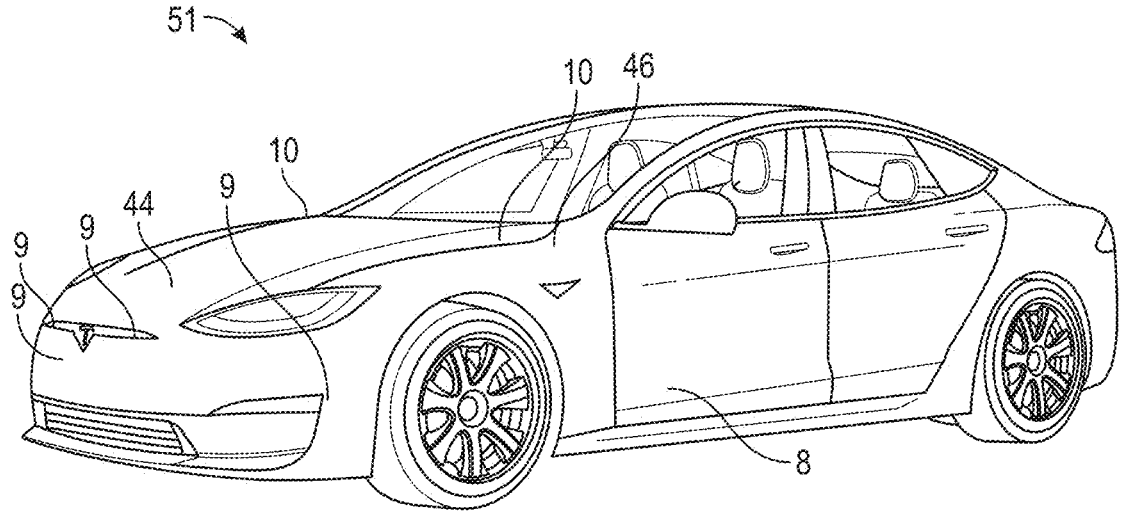
FIGS. 3A-B are exemplary illustrations of another vehicle and an exploded view of a bumper that includes the system of FIG. 1 and another combination of sensors.
Figure 3B:
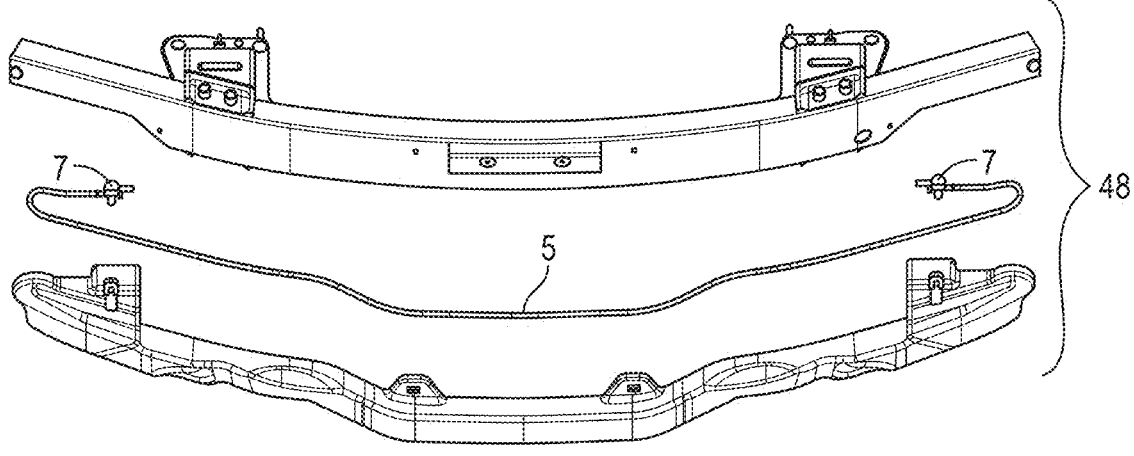

FIG. 1 is a block diagram of a system 2 that moves a hood 44 to a higher position as to effectively absorb impact energy exerted on a pedestrian or colliding body. The system 2 can be incorporated into a variety of vehicles 50, 51. For example, FIGS. 2A-B are exemplary illustrations of a vehicle 50 along with an exploded view of a bumper 48 of the vehicle 50. FIGS. 3A-B are exemplary illustration of another vehicle 51 along with an exploded view of a bumper 49 of the vehicle 51. As shown in FIGS. 1, 2A-B, and 3A-B, the system 2 can include one or more sensors/components 4A, 4B, a controller 8, and a hinge assembly 10. In certain embodiments, the controller 8 is configured to control the system 2, e.g., whether to and/or how to, e.g., position, speed, etc., actuate the hinge assembly 10 upon receiving information from one or more of the sensors/components 4A, 4B. The sensor/components 4A, 4B, such as radar detection systems, camera vision systems, pressure tube sensors, optical sensors, acceleration sensors, photodetectors, infrared detectors, LiDAR, and the like can capture information about the pedestrian, the vehicle's movement, and/or the surrounding driving environment. Exemplary camera vision systems can utilize inputs from one or more camera sensors.

In certain embodiments, the one or more sensors 4A (e.g., vision systems) are configured for detecting a collision with a pedestrian or the like. In certain embodiments, the sensor 4A is configured to generate and/or send a signal and/or information to the controller 8 indicative of the collision. In certain embodiments, the one or more sensors 4A is configured to sense contact of the pedestrian with the vehicle 50, 51. In certain embodiments, the sensor 4A is configured to sense imminent contact of the pedestrian with the vehicle 50, 51. In certain embodiments, the one or more sensors 4A is configured to generate and/or send a signal and/or information to the controller 8 indicative of the sensed contact.

In certain embodiments, the one or more sensors 4A are configured for detecting a characteristics of the pedestrian or colliding body. For example, the characteristic can include a general size of the pedestrian, e.g., one or more of a height, a width, a weight, a position of the pedestrian relative to the vehicle 50, 51, and/or an orientation of the pedestrian relative to the vehicle 50, 51. In certain embodiments, the one or more sensors 4A is configured to generate and/or send a signal and/or information to the controller 8 indicative of the sensed characteristic.

For example, in certain embodiments, the one or more sensors 4A include one or more pressure tubes 5 for detecting the collision. In certain embodiments, the pressure tube 5 can be located within a bumper 48, 49 of the vehicle 50, 51. For example, the pressure tube 5 can be located between a low-density foam and a high-density foam of the bumper 48, 49. In certain embodiments, the low-density foam can be positioned immediately behind a front fascia of the vehicle 50, 51, In certain embodiments, the high-density foam can be positioned immediately in front of a bumper beam of the vehicle 50, 51. In certain embodiments, the system 2 includes one or more pressure sensors 7 configured to sense a pressure change in the pressure tube 5. In certain embodiments, the one or more pressure tube sensors 7 are mounted to the high density foam at either end above a bumper beam to sense a change in the pressure tube 5. Of course other locations on the vehicle 50, 51 are possible as well.

In certain embodiments, the one or more sensors 4A include one or more acceleration sensors 9 for detecting the collision. The one or more acceleration sensors 9 can work in concert with the pressure tube sensors 7 to detect the collision. In certain embodiments, the one or more acceleration sensors 9 can be located on a headlamp support bracket of the vehicle 50, 51. In certain embodiments, the one or more acceleration sensors 9 can be located behind the front fascia of the vehicle 50, 51. Of course other locations on the vehicle 50, 51 are possible as well.

In certain embodiments, the one or more sensors 4A include one or more vision systems (e.g., radar detection systems, camera vision systems, and the like). In certain embodiments, the system 2 employs the one or more vision systems to characterize an object that is about to contact the vehicle 50, 51. In certain embodiments, the characterization includes determining whether the object is a pedestrian, an animal, or stationary object. In certain embodiments, an object characterized as a pedestrian can be further characterized by the pedestrian's mode of transportation (e.g., walking, biking, skateboarding, etc.) and/or physical characteristic of the pedestrian (e.g., height, width, weight, head position, position of the pedestrian relative to the vehicle 50, 51, and/or an orientation of the pedestrian relative to the vehicle 50, 51).

The characterization of the object can assist the controller 8 in determining whether to activate the system 2 and/or how to control activation (e.g., position of the hood 44, speed of moving the hood 44, etc.). For example, in an exemplary embodiment, the controller 8 activates the system 2 if the object is characterized as a pedestrian and then controls its activation of the system 2 based at least in part on the further characterization and/or characteristics of the pedestrian. The system 2 may incorporate machine learning implementations to further refine and improve the characterization process. Of course, the type of sensor/component or modality of operation is not limited to being a vision system and can instead be any other type of sensor/component that can characterize and/or sense a characteristic of the object.

In certain embodiments, the system 2 includes one or more sensors/components 4B for determining a parameter related to operation of the vehicle 50, 51, e.g., velocity, ambient temperature, historical actuator activation information, and the like. In this way, the controller 8 can obtain a plurality of inputs associated with the operation of the vehicle 50, 51.

In certain embodiments, the one or more sensors 4B provide their signal to the controller 8. In certain embodiments, the one or more sensors 4B provide their signal to the controller 8 via a gateway 6 of the vehicle 50, 51. The gateway 8 can provide a convenient bub that interconnects multiple vehicle bus systems to allow sharing of data from the one or more sensors 4B throughout the systems of the vehicle 50, 51. Of course, the system 2 need not include the gateway 6 to provide the signal to the controller 8. In certain embodiments, the signals from the sensors 4A, 4B are transmitted wirelessly to the controller 8.

In certain embodiments, the controller 8 receives the signals from the one or more sensors 4A, 4B to at least in part determine a pedestrian deployment position for the hood 44 and/or a time frame for moving the hood 44 to the pedestrian deployment position. In certain embodiments, the controller 8 can determine operational parameters for the actuator 14, such as power levels, piston speeds, extension times or other operational parameters of the actuator 14 based on a processed set of sensed inputs, e.g., a determination of operational parameters as a function of the sensed inputs, e.g., pedestrian characteristics. The specified operational parameters for the actuator 14 can be selected with consideration of enhancing the level of safety provided by the system 2 to the specific pedestrian.

For example, in certain embodiments, the controller 8 compares the signals indicative of, e.g., characteristic(s) of the pedestrian, contact or imminent contact with the pedestrian, and/or vehicle related parameters, to data in one or more look-up tables and/or one or more predetermined parameters to at least in part determine a pedestrian deployment position for the hood 44 and/or a time frame for moving the hood 44 to the pedestrian deployment position. For example, in certain embodiments, the controller 8 can utilize logic control in the form of the look-up table to map information from the sensors 4A, 4B to operational parameters of the actuator 14. In some embodiments, the look-up table can map individual sensor 4A, 4B values to determine operational parameters for the actuator 14, such as sensor 4A, 4B values that have been determined to be controlling in the selection of the operational parameters of the actuator 14. In other embodiments, the look-up table can combine individual sensor 4A, 4B values to determine the operational parameters of the actuator 14. The sensor 4A, 4B values can be specified as absolute values that are mapped in the look-up table, ranges of values, binary indications (e.g., on or off), or non-numeric categories (e.g., high, medium, or low). Still further, the look-up table can incorporate weighting values such that the sensor 4A, 4B values can have greater impact or are otherwise ordered in a manner that causes the impact of specific input information to influence the determined operational parameters of the actuator 14.

In certain embodiments, the look-up tables utilized by the controller 8 can be specifically configured to individual vehicles 50, 51. Alternatively, the look-up tables can be common to a set of vehicles 50, 51, such as by vehicle type, geographic location, user type, and the like. The look-up tables may be statically configured with the controller 8, which can be periodically updated. In other embodiments, the look-up tables can be more dynamic in which the frequency of update can facilitated via communication functionality associated with the vehicle 50, 51.

In certain embodiments, the look-up table can be configured in a programmatic implementation. Such programmatic implementations can be in the form of mapping logic, a sequence of decision trees, or similar logic. In other embodiments, the controller 8 may incorporate machine learning implementations that may require more refined operation of the actuator 14.

In certain embodiments, the controller 8 provides signals corresponding to the determined operational parameters of the actuator 14 in the form of an activation profile. In certain embodiments, the activation profile is customized for the pedestrian based on, for example, one or more sensed characteristics of the pedestrian.

In certain embodiments, the controller 8 determines that the pedestrian deployment position for the hood 44 is to stay in the closed position. For example, in certain embodiments, the controller 8 maintains the closed position of the hood 44 if the signals from the sensors 4A, 4B indicate, for example, the contact pressure is below a predetermined threshold and/or the velocity of the vehicle 50, 51 is below a predetermined threshold. In certain embodiments, the controller 8 maintains the closed position of the hood 44 if the signals from the sensors 4A, 4B indicate, for example, the contact pressure is above a predetermined threshold. For example, the predetermined thresholds can indicate an imminent collision with another vehicle that would not benefit from raising the hood 44 to the pedestrian deployment position. In certain embodiments, the predetermined thresholds can be determined based on lab determined deployment threshold values and/or machine learning.

In certain embodiments, the system 2 can predict whether the pedestrian will benefit from activation of the hinge assembly 10 prior to activation. For example, the system 2 can detect via the one or more sensors/components 4A, 4B whether the pedestrian meets a minimum predetermined threshold (e.g., size, weight, head height, etc.) below which the system 2 would not increase the level of safety provided to the pedestrian in the event of a collision and activation of the system 2. Similarly, in certain embodiments, the system 2 can detect via the one or more sensors/components 4A, 4B whether the pedestrian exceeds a maximum predetermined threshold (e.g., size, weight, head height, etc.) above which the system 2 would not increase the level of safety provided to the pedestrian in the event of a collision and activation of the system 2. In certain embodiments, the minimum and maximum predetermined thresholds can be determined based on lab determined deployment threshold values and/or machine learning. In certain embodiments, the minimum and maximum predetermined thresholds are each based on a plurality of characteristic of the pedestrian.

In certain embodiments, the controller 8 is configured to transmit a trigger signal that corresponds to the activation profile to the hinge assembly 10 depending on one or more of the signals received from the sensors 4A, 4B. In certain embodiments, the controller 8 is configured to transmit a first trigger signal or a second trigger signal to the hinge assembly 10 depending on, for example, a characteristic of the pedestrian or the activation profile. For example, in certain embodiments, a rate at which the hood 44 moves to the pedestrian deployment position depends on whether the controller 8 transmits the first trigger signal or the second trigger signal to the hinge assembly 10.

In certain embodiments, the hinge assembly 10 comprises a hinge 12 and an actuator 14. In certain embodiments, the actuator 14 can be electromechanical, pyrotechnic, magnetic, or employ any other modality known to a person having ordinary skill in the art. In certain embodiments, the actuator 14 functions as a linear movement device. In certain embodiments, the hinge 12 is configured to guide the hood 44 from the closed or secured position to an open position if the controller 8 does not activate the system 2 as well as to at least a first pedestrian deployment position if the controller 8 does activate the system 2. The first deployment position of the hood 44 is any position of the hood 44 that is above a position of the hood 44 when the hood 44 is in the closed or secured position. In certain embodiments, the controller 8 provides a specific trigger signal to the actuator 14 which causes the actuator 14 to move the hood 44 to one of a plurality of possible pedestrian deployment positions. The controller 8 determines the specific trigger signal based at least in part on one or more of the signals received from the sensors 4A, 4B.

Figure 4:
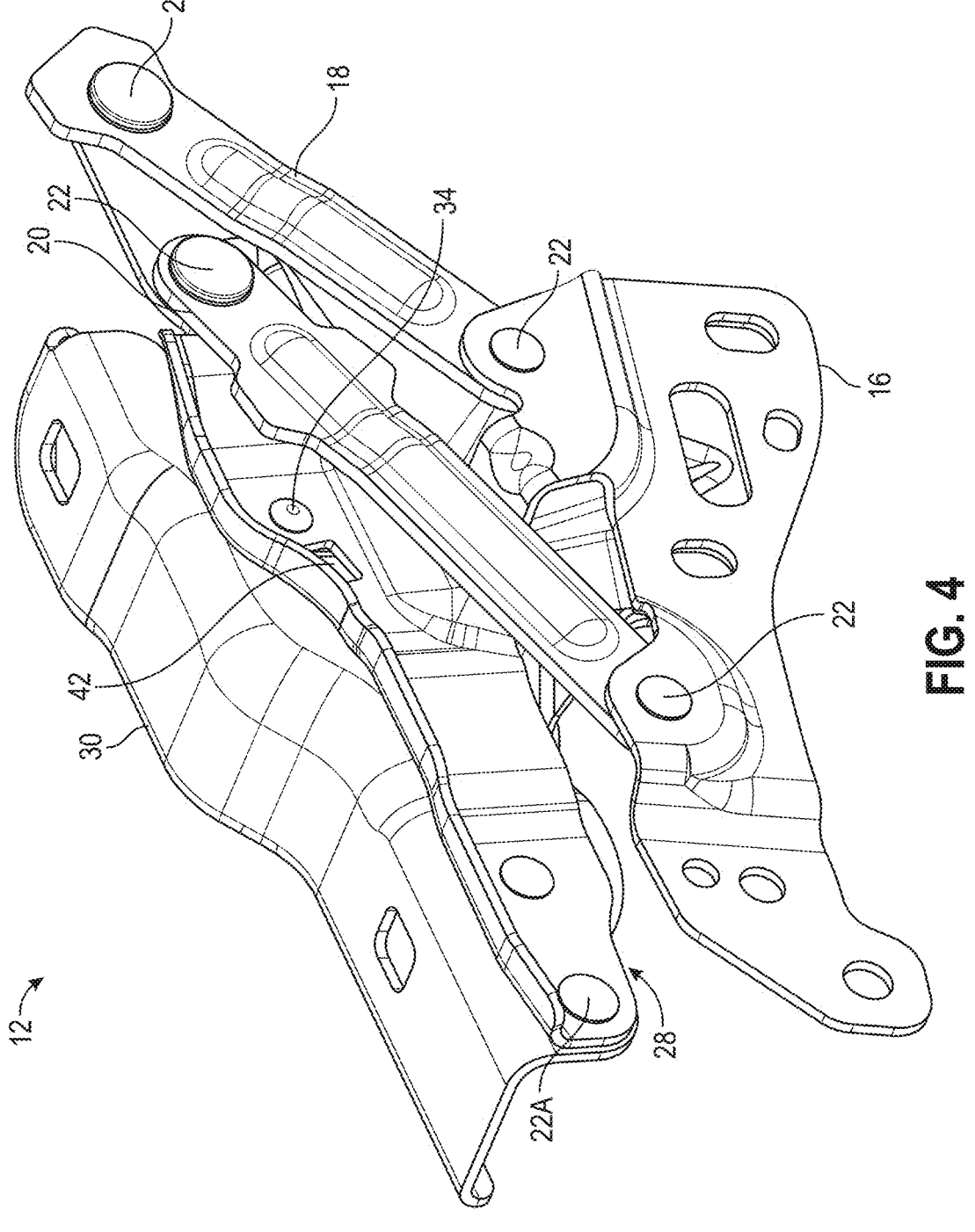
FIG. 4 is a side perspective view of a hinge from the hinge assembly of FIG. 1 or FIG. 2 in a closed position and shows a body bracket movably coupled to a hood bracket.
Figure 5:
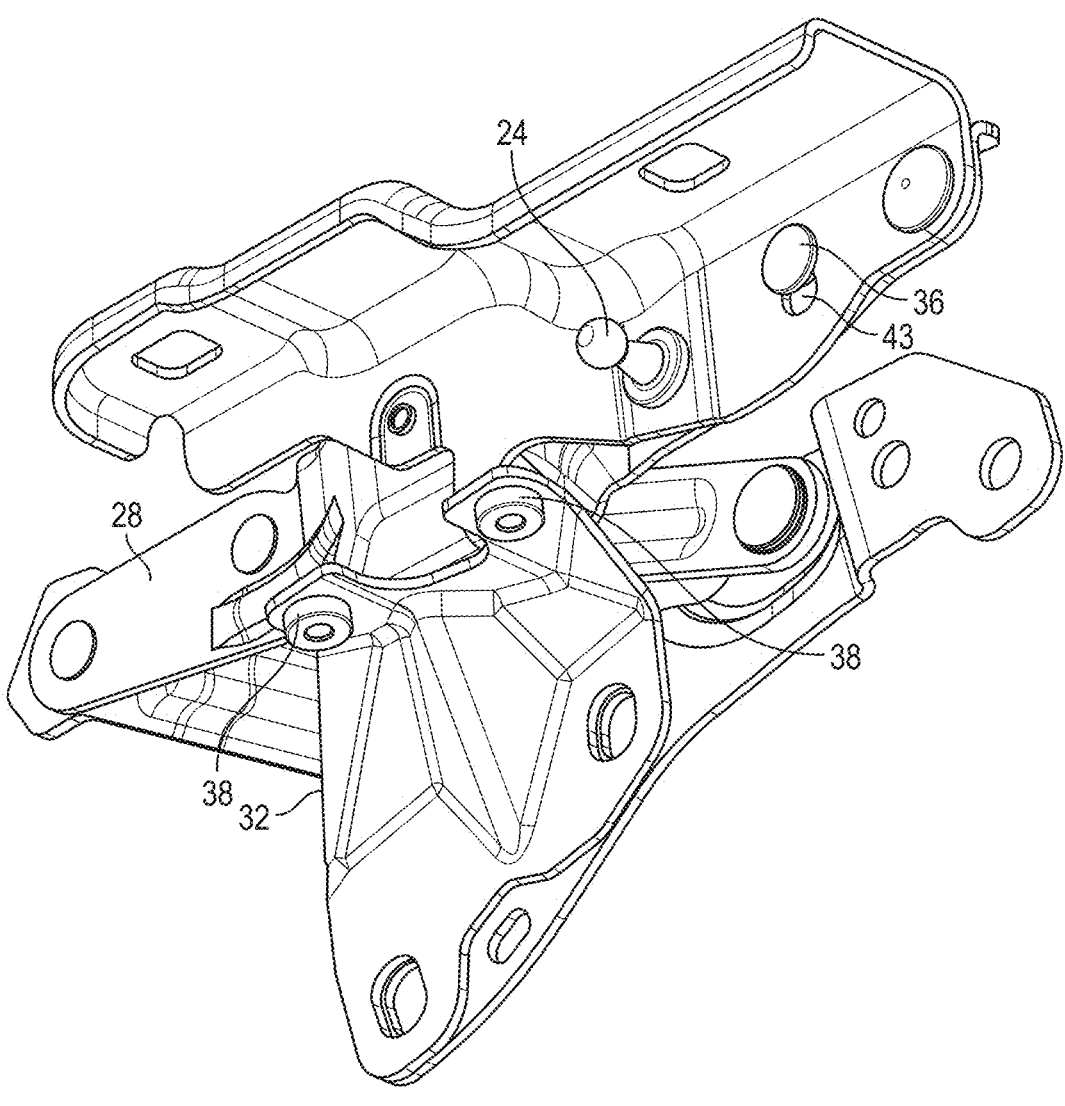
FIG. 5 is an opposite side view relative to FIG. 4 and shows a stop pin engaging the hood bracket to a hood link.

FIG. 4 is a side perspective view of the hinge 12 from the hinge assembly 10 of FIG. 1 in a closed position. FIG. 5 is an opposite side view of the hinge 12 relative to FIG. 4. In certain embodiments, the hinge 12 comprises a body bracket 16 coupled to a hood bracket 30. In certain embodiments, the coupled body bracket 16 and hood bracket 30 allow the hood bracket 30 to move from the closed or secured position to either an open position or to the pedestrian deployment position. In certain embodiments, the body bracket 16 is fixedly coupled to the body 46 of the vehicle 50, 51 via one or more fasteners.

In certain embodiments, the hood bracket 30 comprises a ball stud 24 configured to secure an end of a strut or other structure while allowing the end of the strut to swivel on the ball stud 24. In certain embodiments, the one or more struts can provide a force that supports the weight of the hood 44 when in the open position while also allowing the user to easily overcome the force to close the hood 44.

In certain embodiments, the hinge 12 comprises an actuator bracket 32. In certain embodiments, the actuator bracket 32 is secured to the body 46 of the vehicle 50, 51. In certain embodiments, the actuator bracket 32 is placed against the body bracket 16 and is secured to the body 46 using the same fasteners used to secure the body bracket 16 to the body 46. In this way, in certain embodiments, a portion of the body bracket 16 can be sandwiched between the body 46 and the actuator bracket 32. In other embodiments, the actuator bracket 32 and the body bracket 16 are manufactured as a unitary structure.

In certain embodiments, the actuator bracket 32 comprises one or more weld nuts 38 configured for securing the actuator 14 to the hinge 12. For example, in certain embodiments, one or more fasteners secure the actuator 14 via threads in the one or more weld nuts 38.

Figure 6:
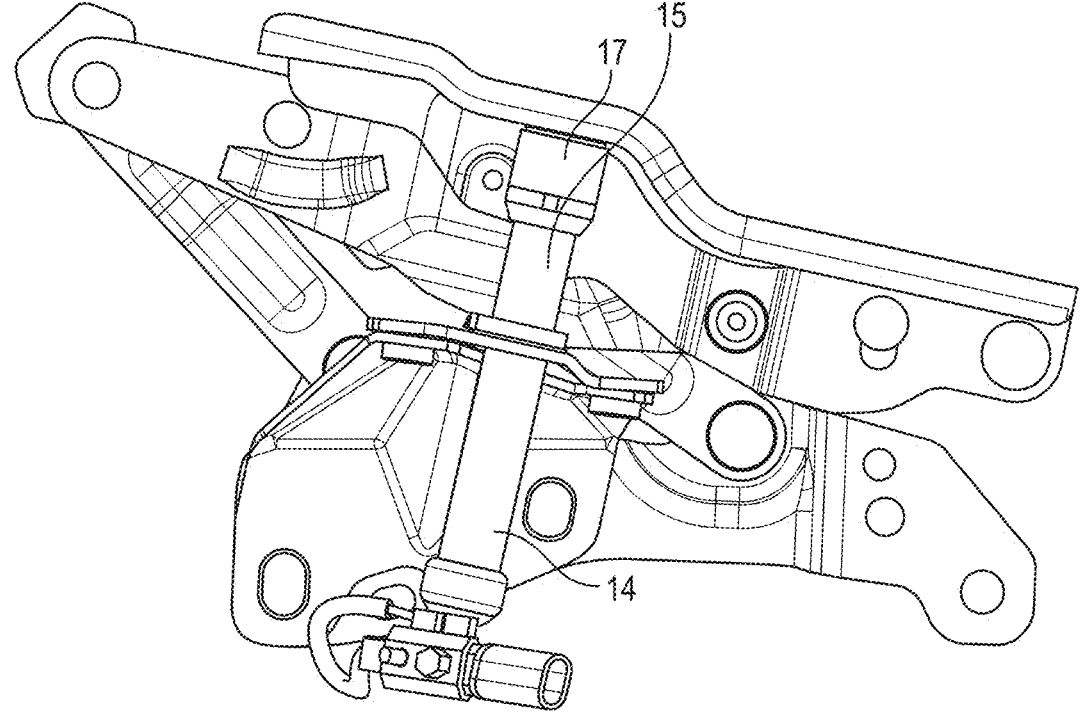
FIG. 6 shows an actuator coupled to the hinge of FIG. 5.

FIG. 6 shows the actuator 14 coupled to the hinge 12 of FIGS. 4 and 5 via the one or more weld nuts 38. In certain embodiments, the actuator 14 is electrically coupled to the controller 8 for receiving one or more trigger signals.

In certain embodiments, the actuator 14 comprises a body 15 having a channel sized and shaped to slidingly receive at least a portion of a piston 17. In the illustrated embodiment, the body 15 is fixed to the hinge 12 with the piston 17 being configured to move from a retracted position to an extended position relative to the body 15. When moving to the extended position, the piston 17 forces the hinge 12 to move the hood 44 to the pedestrian deployment position. For example, in certain embodiments, the piston 17 rapidly and reliably moves in an upward direction to contact the hinge 12 causing the hinge 12 to at least partially open lifting the hood 44 away from the body 46. In certain embodiments, the force applied by the piston 17 overcomes any force keeping the hood 44 in the secured or closed position against the body 46.

In certain embodiments, the hinge 12 further comprises a hood link 28 through which the body bracket 16 couples to the hood bracket 30. For example, in certain embodiments, the hood link 28 directly couples to both the body bracket 16 and the hood bracket 30 while allowing the hood bracket 30 to move relative to the body bracket 16 in certain circumstances. In certain embodiments, the hood link 28 moves in concert with the hood bracket 30 when the hinge 12 moves from the secured position to the open position but also allows the hood bracket 30 to slightly move relative to the hood link 28 when the hinge 12 moves from the secured position to the pedestrian deployment position. In certain embodiments, the hood link 28 pivots with the hood bracket 30 in a first direction of rotation when the hinge 12 moves from the secured position to the open position but also allows the hood bracket 30 to pivot in a second opposite direction of rotation relative to the hood link 28 when the hinge 12 moves from the secured position to the pedestrian deployment position. In certain embodiments, the hood bracket 30 is configured to rotate in one of two opposite directions depending on whether the controller 8 activates the system 2. In other embodiments, the hood bracket 30 is configured to rotate in the same direction regardless of whether the controller 8 activates the system 2.

In certain embodiments, the hinge 12 comprises one or more links 18, 20. The one or more links 18, 20 can couple the body bracket 16 to the hood link 28 to allow the hood bracket 30 to move between the secured or closed position and the open position. In the illustrated embodiment, the hinge 12 comprises a rear link 18 and a front link 20. Opposite ends of each of the one or more links 18, 20 are coupled to the body bracket 16 and the hood link 28 via hinge pins 22. The hinge pins 22 are sized and shaped to allow the one or more links 18, 20 to rotate about a circumference of the hinge pin 22 when the hood bracket 30 moves between the secured or closed position and the open position.

In certain embodiments, the hinge 12 comprises an adjusting screw 26 configured to allow a user to adjust the precise position of the hood 44 relative to the body 46 of the vehicle 50, 51 when in the closed position. In certain embodiments, rotation of the adjusting screw 26 relative to the hinge 12 increases or decreases a gap between the hood bracket 30 and the body bracket 16.

In certain embodiments, the hinge 12 comprises a shear pin 34 between the hood link 28 and the hood bracket 30. The shear pin 34 is configured to couple the hood bracket 30 to the hood link 28 so that when the system 2 is not activated, the hood bracket 30 and the hood link 28 move in concert when the hood 44 is moved between the secured or closed position and the open position. In this way, the shear pin 34 prevents any significant relative movement between the hood bracket 30 and the hood link 28 when the system 2 is not activated. The shear pin 34 is further configured to shear or break when the system 2 is activated. For example, when the controller 8 triggers the actuator 14, the piston 17 exerts an upward force against the hood bracket 30 that first causes the hood bracket 30 to shear or break the shear pin 34 to allow the piston 17 to then raise the hood 44 to the pedestrian deployment position.

Figure 7:
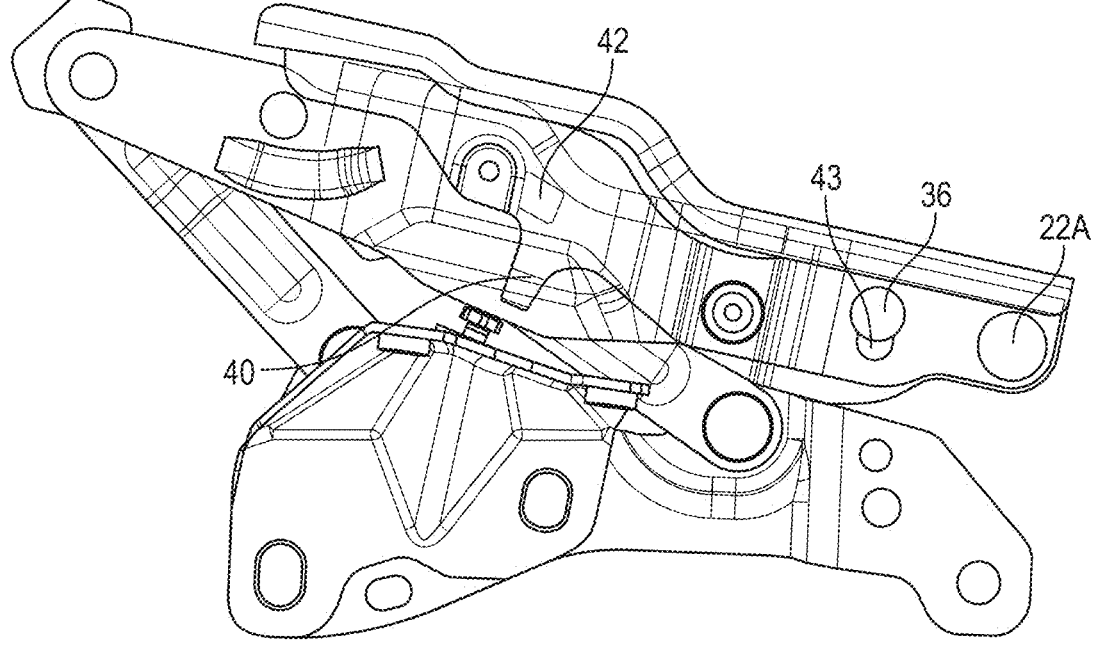
FIG. 7 is similar to FIG. 6 except the actuator has been removed to show a tab and a stop pin configured to engage with slots in the hood link and the hood bracket, respectively, to lock the hood bracket in a pedestrian deployment position.

FIG. 7 is similar to FIG. 6 except the actuator 14 has been removed to show a tab 40 of the hood bracket 30 configured to engage with a slot 42 in the hood link 28 along with the stop pin 36 locked in the keyway slot 43 to lock the hood bracket 30 in the pedestrian deployment position. While only a single tab 40 and a single slot 42 are illustrated, the hinge 12 can comprise a plurality of tabs 40 and/or a plurality of slots 42 to provide a plurality of pedestrian deployment positions for the hood bracket 30.

In certain embodiments, the hinge 12 comprises the tab 40 and the stop pin 36 that upon use are retained within the slots 42, 43, respectively. In certain embodiments, the stop pin 36 enhances the structural integrity of the hinge 12 when the hinge 12 is in the pedestrian deployment position. In certain embodiments, the stop pin 36 enhances the structural integrity of the hinge 12 when a collision occurs that does not result in the controller 8 triggering the system 2.

Figure 8:
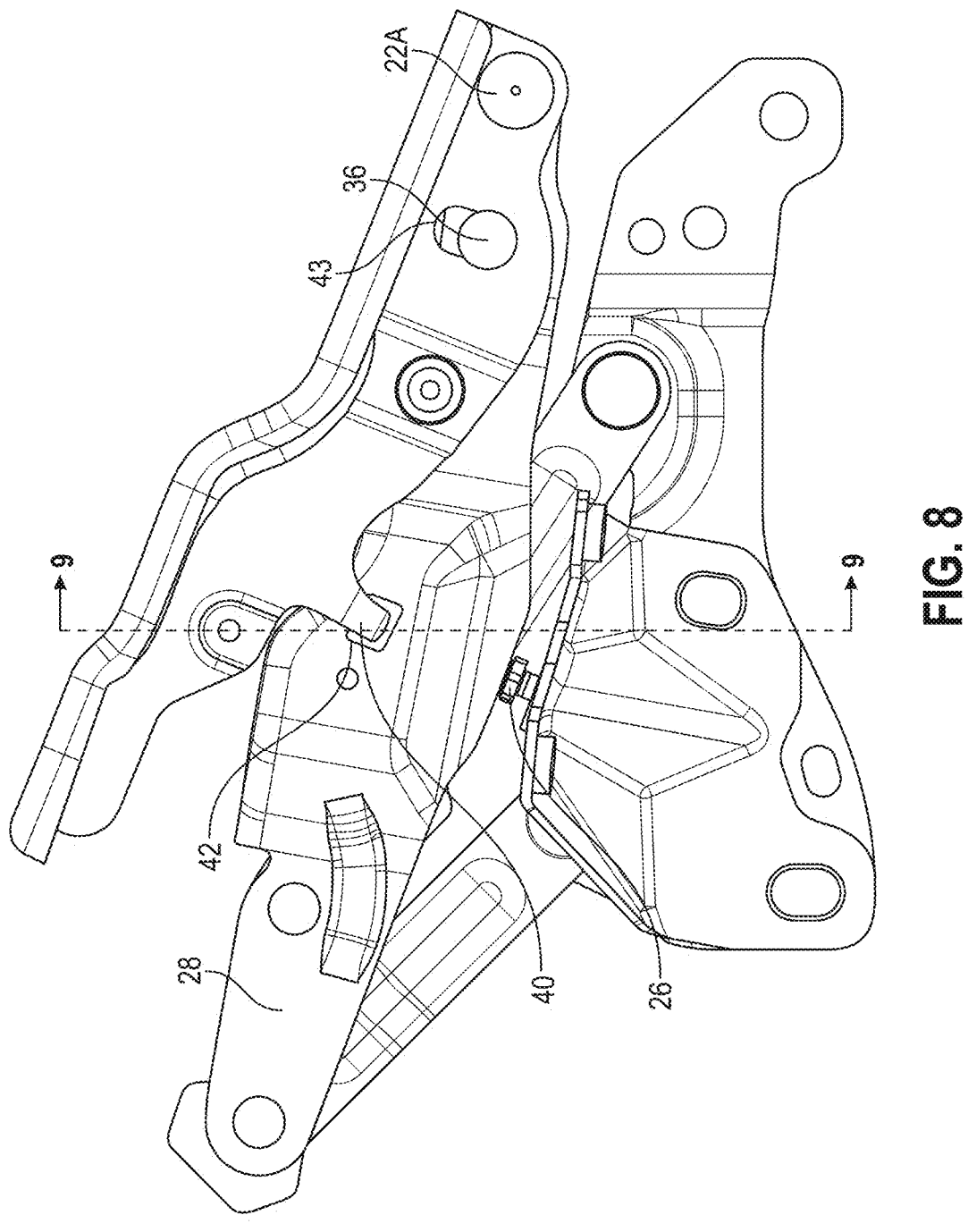
FIG. 8 is a side view of the hinge from FIG. 7 in the pedestrian deployment position with the tab of the hood bracket engaged with the slot in the hood link and the stop pin locked in the keyway slot of the hood bracket.

FIG. 8 is a side view of the hinge 12 from FIG. 7 in the pedestrian deployment position with the tab 40 of the hood bracket 30 engaged with the slot 42 in the hood link 28 along with the stop pin 36 locked in the keyway slot 43 in the hood bracket 30. In certain embodiments, the keyway slot 43 comprises two pockets connected together by a narrow web. In certain embodiments, the web is sized and shaped to inhibit the stop pin 36 from freely moving between the two pockets.

Figure 9:
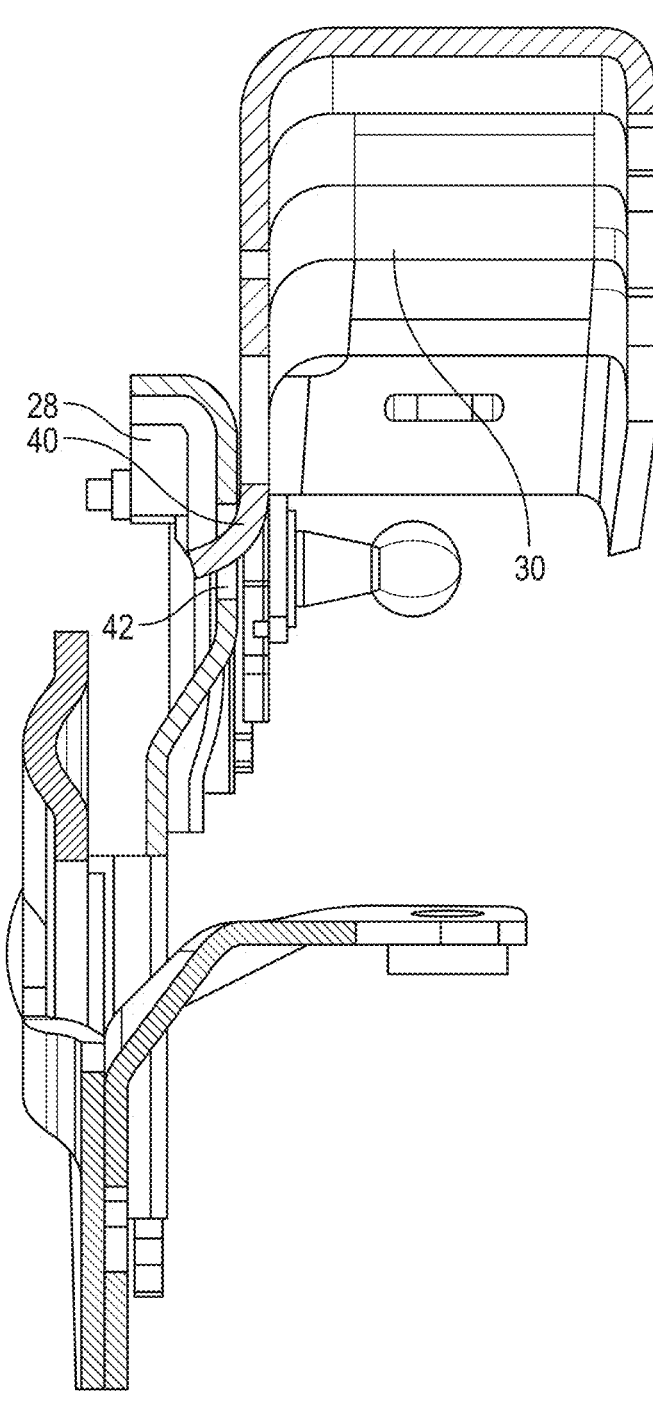
FIG. 9 is a cross section view taken along lines 9-9 in FIG. 8 showing the tab of the hood bracket engaged with the slot in the hood link.

FIG. 9 is a cross section view along lines 9-9 in FIG. 8 showing the tab 40 of the hood bracket 30 engaged with the slot 42 in the hood link 28. In certain embodiments, after the shear pin 34 breaks, the tab 40 becomes trapped in the slot 42. For example, in certain embodiments, a distal end of the tab 40 elastically deforms to enter the slot 42. Once in the slot 42, the distal end of the tab 40 flexes at least partially towards its original shape to lock within the slot 42.

In certain embodiments, a surface of the hood link 28 comprises a ramp like profile configured to elastically deform the tab 40. For example, as the hood bracket 30 slightly rotates about the front most hinge pin 22A to rise relative to the hood link 28, the tab 40 rubs against the hood bracket 30 in a direction towards the slot 42. When the hood 44 generally reaches the pedestrian deployment position, the tab 40 falls off the ramp and locks in the slot 42. Once in the slot 42, the tab 40 prevents the hinge 12 and the hood 44 together from collapsing if there is contact with a pedestrian. However, while the hinge 12 does not collapse, the contact with the pedestrian causes the hood 44 to deform. In this way, the hood 44 provides more cushion and improved protection against head injury.

In the illustrated embodiment, the stop pin 36 limits further rotation of the hood bracket 30 relative to the hood link 28 once the tab 40 engages the slot 42. In this way, the system 2 can provide improved pedestrian head impact performance across the top surface of the hood 44. Of course, the hinge 12 need not include both securement structures (e.g., tab 40 and stop pin 36) to improve pedestrian head impact performance. For example, the hinge 12 can comprise the tab 40 and/or the stop pin 36.

In the illustrated embodiments, the hinge 12 comprises both securement structures creating a dual feature locking system that firmly holds the hood 44 in the selected pedestrian deployment position of the plurality of possible pedestrian deployment positions and maintains clearance between a top surface of the hood 44 and any under hood 44 components.

Figure 10:
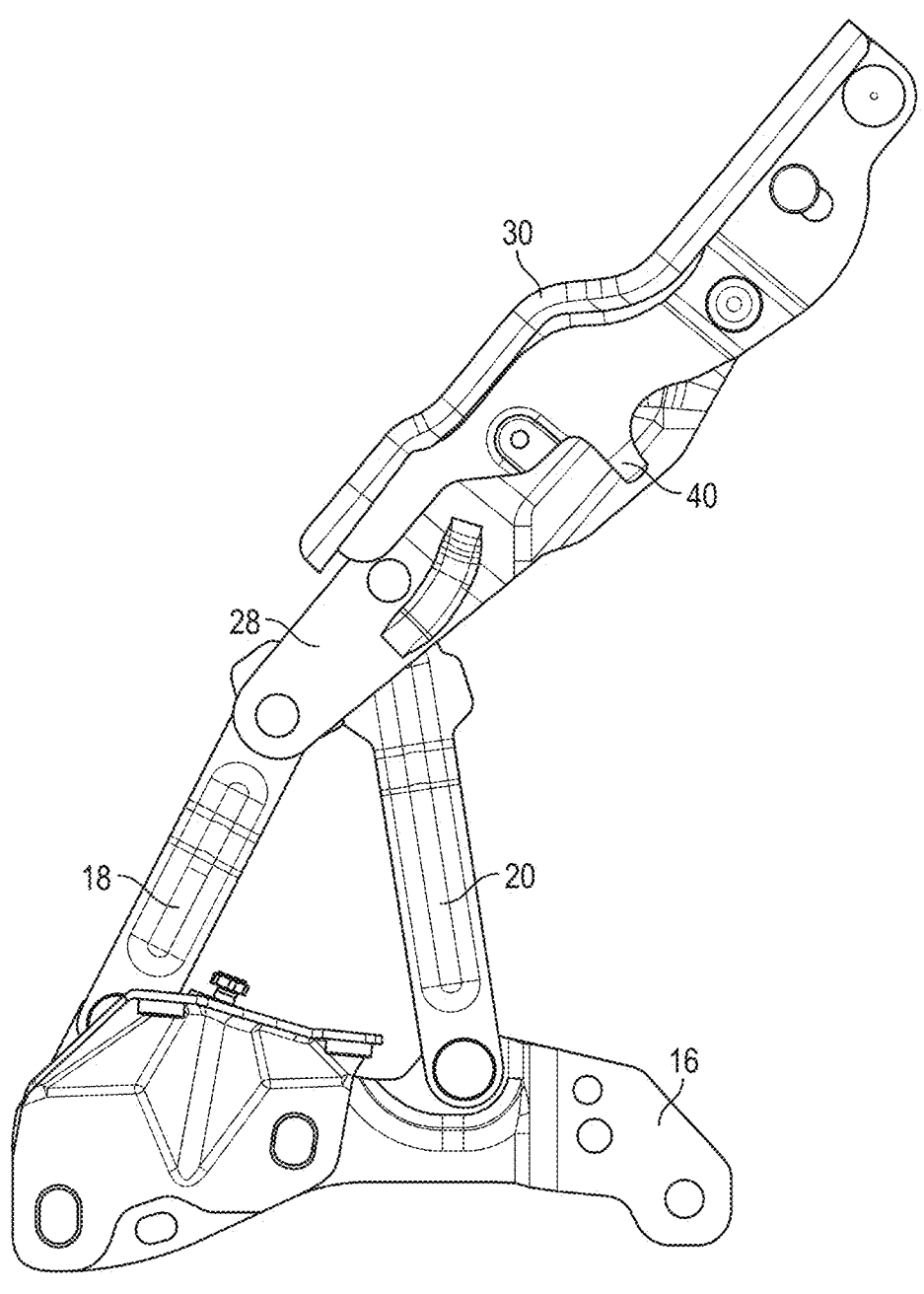
FIG. 10 is a side view of the hinge from FIG. 7 in a fully open position.

FIG. 10 is a side view of the hinge 12 from FIG. 7 in a fully open position. When the hood bracket 30 is in the secured or closed position, the hood 44 is closed over, for example, a compartment in the body 46 of the vehicle 50, 51. When the hood bracket 30 is in the open position, the hood 44 is open to allow the user to access the compartment. When the hood bracket 30 is in the pedestrian deployment position (FIG. 8), at least a portion of the hood 44 is raised up from the body 46 to increase the level of safety provided to a pedestrian in the event of a collision.

Figures 11A, 11B, 11C:
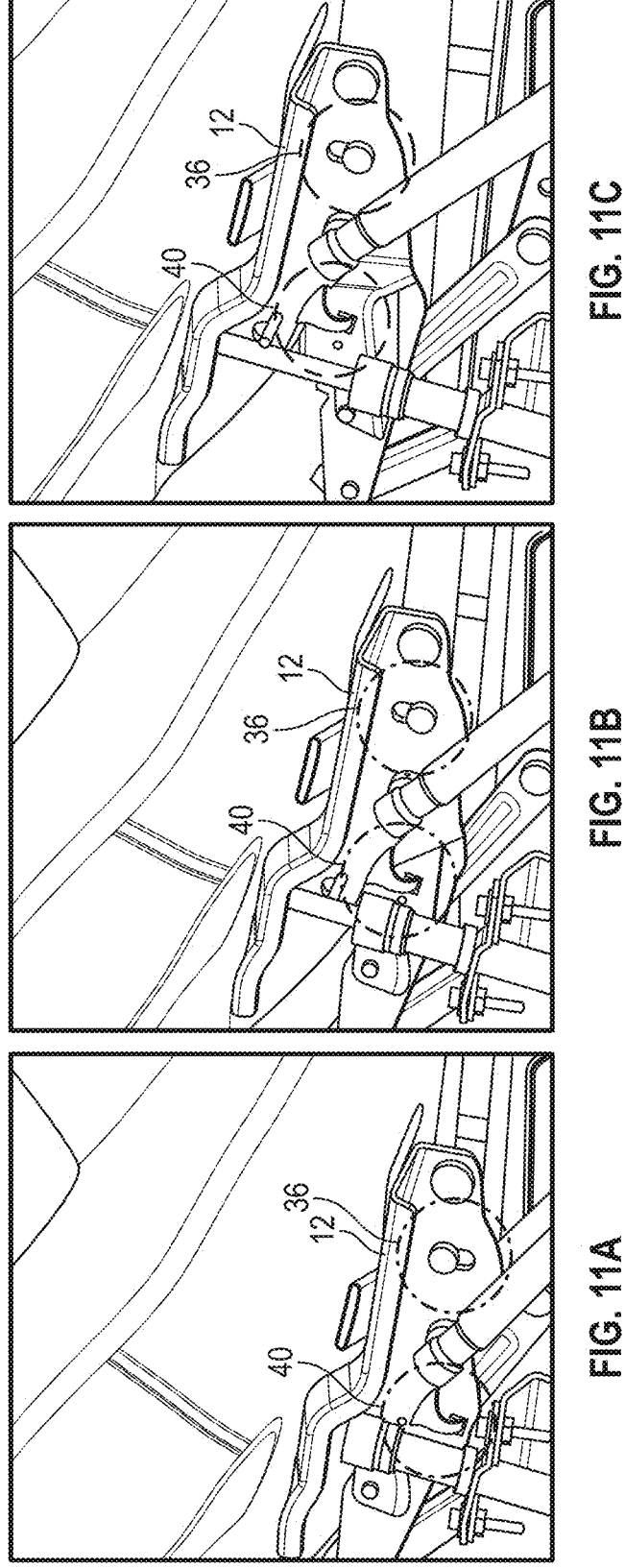
FIGS. 11A-C are side views of the hinge from FIG. 7 in different positions of deployment beginning with the closed position similar to FIG. 7 and ending with the pedestrian deployment position similar to FIG. 8.

FIGS. 11A-C are side views of the hinge 12 from FIG. 7 in different positions of deployment beginning with the closed position similar to FIG. 7 and ending with the pedestrian deployment position similar to FIG. 8. FIG. 11A is an illustration of the hinge 12 prior to deployment. FIG. 11B is an illustration of the hinge 12 during deployment. FIG. 11C is an illustration of the hinge 12 when locked.

In certain embodiments, prior to deployment, the tab 40 is disengaged from the slot 42 and the stop pin 36 is in an upper pocket of the keyway slot 43. During deployment, the tab 40 elastically deforms along an inclined surface of the hood link 28. The stop pin 36 is forced through the narrow web of the keyway slot 43 by slightly elastically deforming the web. When the hinge 12 is locked, the tab 40 falls off of the inclined surface and springs into the slot 42 which locks the tab 40. Once forced through the web of the keyway slot 43 and into the lower pocket of the hood bracket 30, the web slightly elastically narrows to inhibit the stop pin 36 from passing back through the web of the keyway slot 43 and returning to the upper pocket.

Figure 12:
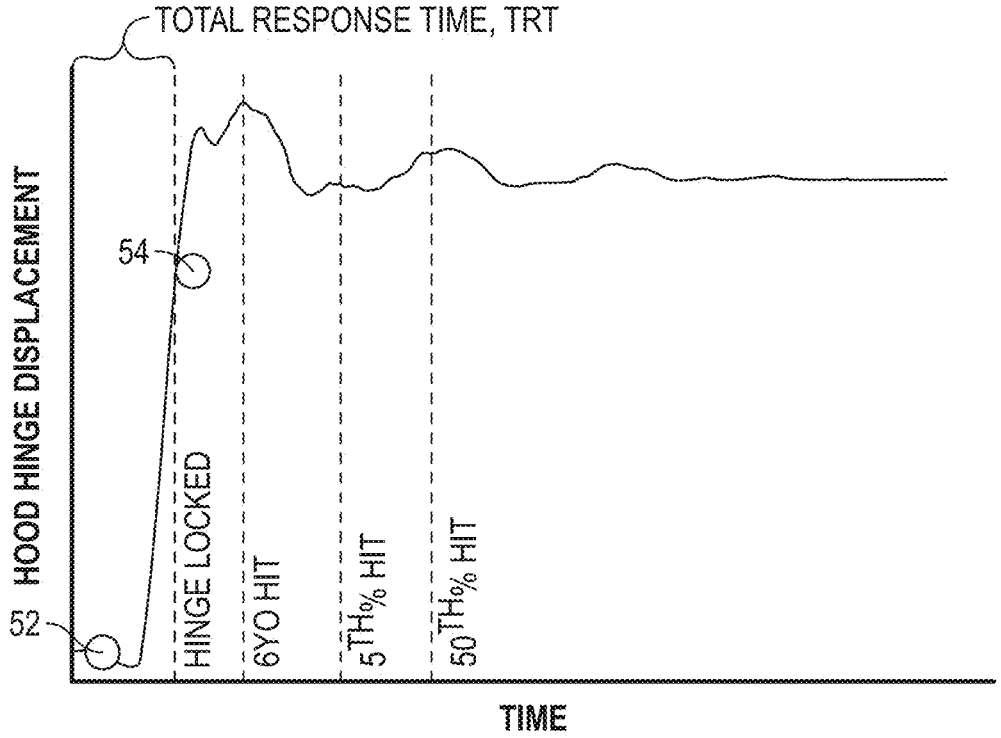
FIG. 12 is a chart of hood hinge displacement and head impact time ("HIT") until the head of pedestrians having different characteristics contacts the hood.

FIG. 12 is a chart of hood hinge displacement and head impact time ("HIT") until the head of pedestrians having different characteristics contacts the hood 44. The total response time ("TRT") includes the sensing time 52 and the deployment time 54 of the system 2. As shown in FIG. 12, the time until the head of the pedestrian contacts the hood 44 can depend on characteristics of the pedestrian. For example, as shown in FIG. 12, the time until a $50^{th}$ % size adult contacts the hood 44 is greater that the time until a 6 year-old or a 5% size adult contacts the hood 44. In certain embodiments, the controller 8 sends a specific trigger signal or actuation profile to the hinge assembly 10 that takes into account one or more characteristics of the pedestrian to enhance the level of safety provided by the system 2. For example, in certain embodiments, the trigger signal from the controller 8 places the hood 44 in the selected pedestrian deployment position of the plurality of possible pedestrian deployment positions and within a time frame that corresponds to an actuation profile that takes into account one or more characteristics of the pedestrian to further enhance the level of safety provided by the system 2 for the specific pedestrian. By customizing the position and/or time frame the head injury criterion ("HIC") score can be further reduced as compared to providing a generic actuation profile.

Figure 13:
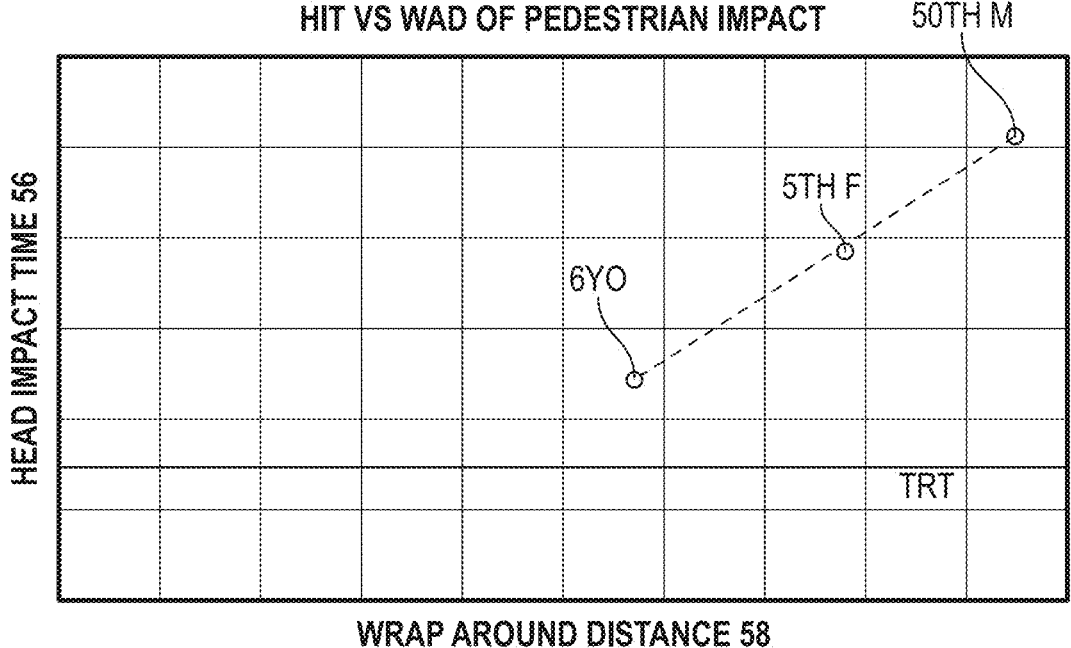
FIG. 13 is a chart of HIT and wrap around distances for pedestrians having different characteristics contact the hood.

FIG. 13 is a chart of head impact time ("HIT") 56 and wrap around distances 58 for pedestrians having different characteristics contacting the hood 44. As shown in FIG. 13, the wrap around distance 58 of the pedestrian and the time 56 until the head of the pedestrian contacts the hood 44 can depend on characteristics of the pedestrian. For example, as shown in FIG. 13, the distance that a 50th % size male adult wraps around the hood 44 is greater that the distance that a 6 year-old or a 5% size female adult wraps around the hood 44. In certain embodiments, the controller 8 sends a specific trigger signal or actuation profile to the hinge assembly 10 that takes into account one or more characteristics of the pedestrian to enhance the level of safety provided by the system 2. For example, in certain embodiments, the trigger signal from the controller 8 places the hood 44 in the selected pedestrian deployment position of the plurality of possible pedestrian deployment positions and within a time frame that corresponds to an actuation profile that takes into account the expected HIT 56 and/or wrap around distance 58 to further enhance the level of safety provided by the system 2 for the specific pedestrian. By customizing the position and/or time frame the head injury criterion ("HIC") score can be further reduced as compared to providing a generic actuation profile.

Figures 14A, 14B, 14C:
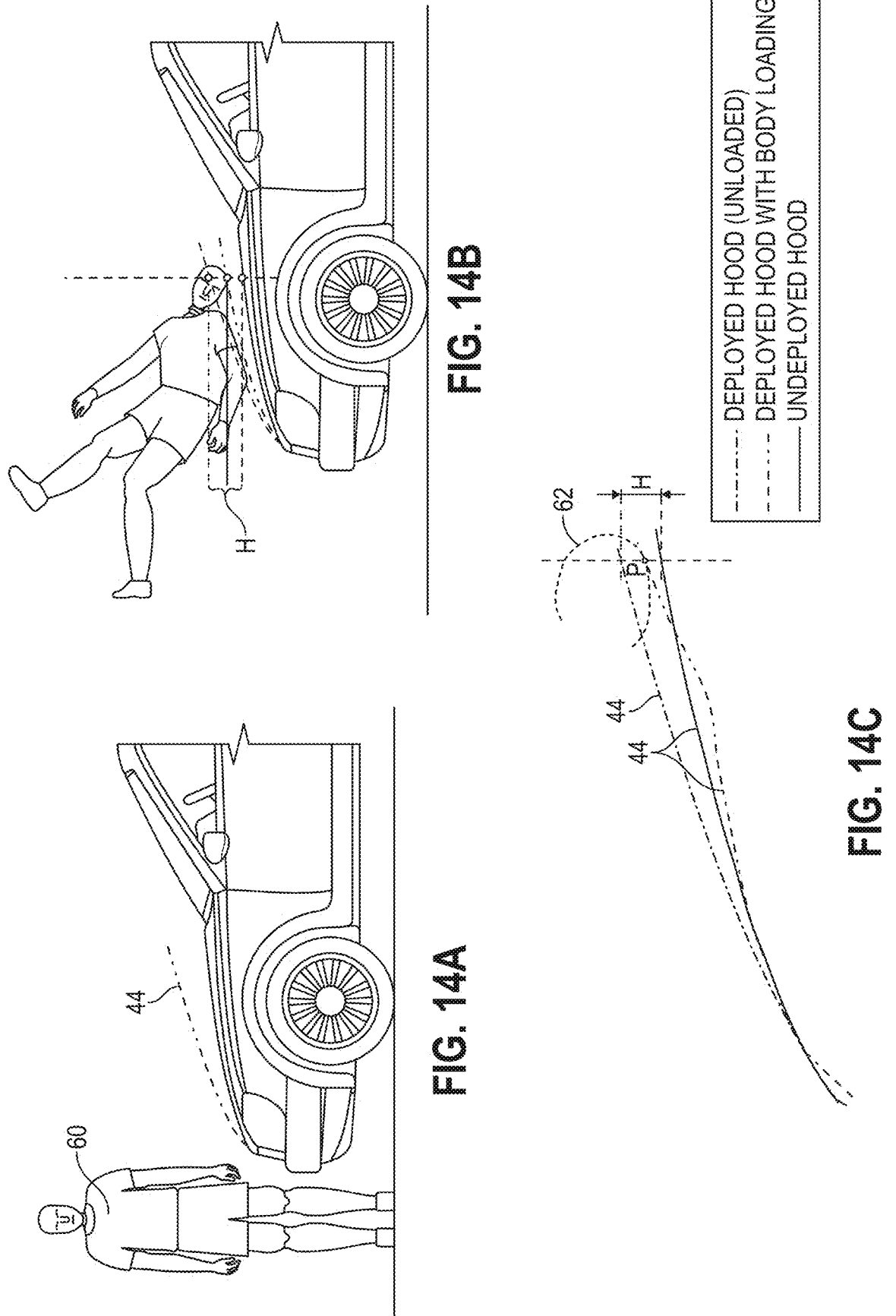
FIGS. 14A-C include illustrations and chart showing how body loading of the pedestrian can reduce the pedestrian deployment position of the hood prior to the head of the pedestrian contacting the hood.

FIGS. 14A-C include illustrations and chart showing how body loading of the pedestrian 60 can reduce the pedestrian deployment position of the hood 44 prior to the head 62 of the pedestrian contacting the hood 44. As shown in FIGS. 14A and 14B, a characteristic, such as the body loading of the pedestrian 60, can compress or change the position of the hood 44. Changing the position of the hood 44 prior to contact with the head 62 can adversely impact the level of safety provided by the system 2. For example, as shown in FIG. 14C, the body loading reduces the pedestrian deployment position of the hood 44 by over 50%. Further, the body loading can vary depending on the characteristics of the pedestrians. In certain embodiments, the controller & sends a specific trigger signal or actuation profile to the hinge assembly 10 that takes into account one or more characteristics of the pedestrian to enhance the level of safety provided by the system 2. For example, in certain embodiments, the trigger signal from the controller 8 places the hood 44 in the selected pedestrian deployment position of the plurality of possible pedestrian deployment positions and within a time frame that corresponds to an actuation profile that takes into account body loading to further enhance the level of safety provided by the system 2 for the specific pedestrian. By customizing the position and/or time frame the head injury criterion ("HIC") score can be further reduced as compared to providing a generic actuation profile.

Figure 15:
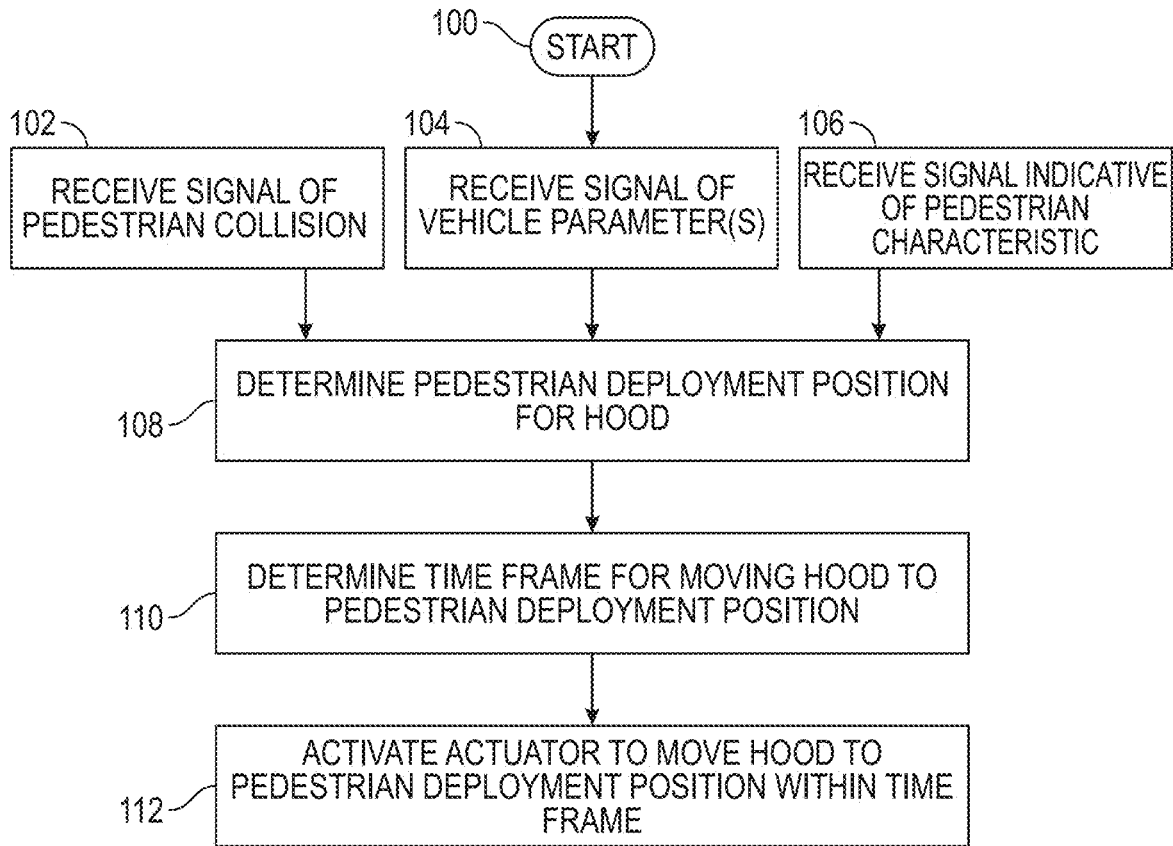
FIG. 15 is a flow chart of an exemplary process performed by the controller from FIG. 1 to have the hood moved to a pedestrian deployment position in a time frame based at least in part on a sensed characteristic of the pedestrian.

FIG. 15 is a flow chart of an exemplary process 100 to move the hood 44 to the selected pedestrian deployment position of the plurality of possible pedestrian deployment positions in the time frame based at least in part on a sensed characteristic of the pedestrian. The process 100 may be implemented for each individual actuator 14, such as by the controller 8 configured to determine operational parameters for individual actuators 14 and generate control signals corresponding to the determined operational parameters for the actuator 14. Alternatively, process 100 may be implemented for a set of actuators 14 located on the vehicle 50, 51.

At block 102, the controller 8 receives a signal indicative of a pedestrian collision. For example, in certain embodiments, the one or more sensors 4A detect a collision with a pedestrian or the like. In certain embodiments, the sensor 4A is configured to generate and/or send the signal to the controller 8. In certain embodiments, the one or more sensors 4A is configured to sense contact of the pedestrian with the vehicle 50, 51. In certain embodiments, the sensor 4A is configured to sense imminent contact of the pedestrian with the vehicle 50, 51, In certain embodiments, the one or more sensors 4A is configured to generate and/or send the signal to the controller 8 indicative of the sensed contact.

At block 104, the controller 8 receives a signal related to a vehicle parameter. For example, in certain embodiments, the one or more sensors 4B determine a parameter related to operation of the vehicle 50, 51, e.g., velocity, ambient temperature, historical actuator activation information, and the like. In this way, the controller 8 can obtain a plurality of inputs associated with the operation of the vehicle 50, 51. In certain embodiments, the one or more sensors 4B provide their signal to the controller 8.

At block 106, the controller 8 receives a signal indicative of one or more pedestrian characteristics. For example, in certain embodiments, the one or more sensors 4A detect a characteristics of the pedestrian or colliding body. For example, the characteristic can include a general size of the pedestrian, e.g., one or more of a height, a width, a weight, a position of the pedestrian relative to the vehicle 50, 51, and/or an orientation of the pedestrian relative to the vehicle 50, 51. In certain embodiments, the one or more sensors 4A generate and/or send a signal to the controller 8 indicative of the sensed characteristic.

At blocks 108 and 110, the controller 8 determines a pedestrian deployment position from the plurality of possible pedestrian deployment positions for the hood 44 and/or a time frame for moving the hood 44 to the selected pedestrian deployment position. In some embodiments, an evaluation of a look-up table may be deterministic such that the pedestrian deployment position and/or the time frame may result from evaluation of the look-up table. As previously described, the operational parameters for the actuator 14 can include power levels, piston speeds, extension times or other operational parameters of the actuator 14 based on a processed set of sensed inputs, e.g., a determination of operational parameters as a function of the sensed inputs, e.g., pedestrian characteristics. The specified operational parameters for the actuator 14 can be selected with consideration of enhancing the level of safety provided by the system 2 to the specific pedestrian.

For example, in certain embodiments, the controller 8 compares the signals indicative of, e.g., characteristic(s) of the pedestrian, contact or imminent contact with the pedestrian, and/or vehicle related parameters, to data in one or more look-up tables and/or one or more predetermined parameters to at least in part determine the selected pedestrian deployment position of the plurality of possible pedestrian deployment positions for the hood 44 and/or a selected time frame from a plurality of time frames for moving the hood 44 to the pedestrian deployment position. For example, in certain embodiments, the controller 8 can utilize logic control in the form of the look-up table to map information from the sensors 4A, 4B to operational parameters of the actuator 14. In some embodiments, the look-up table can map individual sensor 4A, 4B values to determine operational parameters for the actuator 14, such as sensor 4A, 4B values that have been determined to be controlling in the selection of the operational parameters of the actuator 14.

In certain embodiments, the controller 8 provides the determined operational parameters of the actuator 14 in the form of an activation profile. In certain embodiments, the activation profile is customized for the pedestrian based on, for example, one or more sensed characteristics of the pedestrian.

At block 112, the controller 8 transmits information or control signals that cause the hood 44 to move to the selected pedestrian deployment position within the selected time frame in accordance with the selected and processed operational parameters. In certain embodiments, the trigger signal or actuation profile takes into account one or more characteristics of the pedestrian to enhance the level of safety provided by the system 2. By customizing the position and/or time frame the head injury criterion ("HIC") score can be further reduced as compared to providing a generic actuation profile.

Process 100 returns to block 100 in embodiments for continuous monitoring. Alternatively, the process 100 can wait for institution of the routine process 100.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, a person of ordinary skill in the art will recognize that changes may be made in form and detail without departing from the scope of the present disclosure. Thus, the present disclosure is limited only by the claims.

In the foregoing specification, the disclosure has been described with reference to specific embodiments. However, as one skilled in the art will appreciate, various embodiments disclosed herein can be modified or otherwise implemented in various other ways without departing from the spirit and scope of the disclosure. Accordingly, this description is to be considered as illustrative and is for the purpose of teaching those skilled in the art the manner of making and using various embodiments of the disclosed glove box actuation assembly. It is to be understood that the forms of disclosure herein shown and described are to be taken as representative embodiments. Equivalent elements, materials, processes or steps may be substituted for those representatively illustrated and described herein. Moreover, certain features of the disclosure may be utilized independently of the use of other features, all as would be apparent to one skilled in the art after having the benefit of this description of the disclosure. Expressions such as "including", "comprising", "incorporating", "consisting of", "have", "is" used to describe and claim the present disclosure are intended to be construed in a non-exclusive manner, namely allowing for items, components or elements not explicitly described also to be present. Reference to the singular is also to be construed to relate to the plural.

Further, various embodiments disclosed herein are to be taken in the illustrative and explanatory sense, and should in no way be construed as limiting of the present disclosure. All joinder references (e.g., attached, affixed, coupled, connected, and the like) are only used to aid the reader's understanding of the present disclosure, and may not create limitations, particularly as to the position, orientation, or use of the systems and/or methods disclosed herein. Therefore, joinder references, if any, are to be construed broadly. Moreover, such joinder references do not necessarily infer that two elements are directly connected to each other. Additionally, all numerical terms, such as, but not limited to, "first", "second", "third", "primary", "secondary", "main" or any other ordinary and/or numerical terms, should also be taken only as identifiers, to assist the reader's understanding of the various elements, embodiments, variations and/or modifications of the present disclosure, and may not create any limitations, particularly as to the order, or preference, of any element, embodiment, variation and/or modification relative to, or over, another element, embodiment, variation and/or modification.

It will also be appreciated that one or more of the elements depicted in the drawings/figures can also be implemented in a more separated or integrated manner, or even removed or rendered as inoperable in certain cases, as is useful in accordance with a particular application.

What is claimed is:

1. A method for controlling a vehicle hood hinge assembly, comprising:
   receiving, by a controller, a first signal indicative of an imminent or occurred pedestrian collision;
   receiving, by the controller, a second signal indicative of a wrap around distance of the pedestrian;
   determining, by the controller, a deployment height for a hood based on the wrap around distance; and
   actuating the hood to the determined deployment height prior to head impact of the pedestrian with the hood.

2. The method of claim 1, further comprising:
   determining an expected head impact time (HIT) based on the wrap around distance; and
   wherein actuating the hood includes moving the hood to the deployment height within a time frame based on the expected head impact time.

3. The method of claim 1, wherein the wrap around distance is determined based on a characteristic of the pedestrian detected by a sensor.

4. The method of claim 3, wherein the characteristic of the pedestrian includes at least one of a height, a width, a weight, a position of the pedestrian relative to the vehicle, or an orientation of the pedestrian relative to the vehicle.

5. The method of claim 1, further comprising:
   accessing a lookup table that maps pedestrian characteristics to deployment parameters; and
   determining the deployment height based on the lookup table.

6. The method of claim 1, wherein actuating the hood includes activating a multi-stage actuator coupled to a hinge assembly of the hood.

7. The method of claim 1, further comprising:
   detecting a reduction in the deployment height due to body loading of the pedestrian; and
   adjusting operation of an actuator to compensate for the detected reduction.

8. The method of claim 1, wherein the first signal is received from at least one of an optical sensor, a camera, LiDAR, radar, an accelerometer, or a pressure sensor.

9. The method of claim 1, further comprising:
   engaging a locking mechanism when the hood reaches the deployment height to maintain the hood at the deployment height during impact with the pedestrian.

10. The method of claim 9, wherein the locking mechanism includes at least one of a tab engaging a slot or a stop pin engaging a keyway.

11. A vehicle safety system, comprising:

a hood configured to selectively cover a compartment;

a multi-stage actuator coupled to the hood;

a sensor configured to detect body loading of a pedestrian during a collision; and a controller configured to:

determine an initial deployment position for the hood;

detect, via the sensor, a reduction in the deployment position due to body loading of the pedestrian; and adjust operation of the multi-stage actuator to compensate for the detected reduction in deployment position.

12. The vehicle safety system of claim 11, wherein the controller is further configured to determine the initial deployment position based on a characteristic of the pedestrian.

13. The vehicle safety system of claim 12, wherein the characteristic of the pedestrian includes a wrap around distance of the pedestrian.

14. The vehicle safety system of claim 11, wherein the controller is further configured to:

access a lookup table that maps pedestrian characteristics to deployment parameters; and determine the initial deployment position based on the lookup table.

15. The vehicle safety system of claim 11, wherein the multi-stage actuator is configured to move the hood to the initial deployment position at a rate determined based on an expected head impact time.

16. The vehicle safety system of claim 11, further comprising a locking mechanism configured to maintain the hood at the initial deployment position during impact with the pedestrian.

17. The vehicle safety system of claim 16, wherein the locking mechanism includes at least one of a tab engaging a slot or a stop pin engaging a keyway.

18. The vehicle safety system of claim 11, wherein the sensor includes at least one of an optical sensor, a camera, LiDAR, radar, an accelerometer, or a pressure sensor.

19. The vehicle safety system of claim 11, wherein the controller is further configured to:

determine a time frame for moving the hood to the initial deployment position based on a wrap around distance of the pedestrian; and control the multi-stage actuator to move the hood within the determined time frame.

20. The vehicle safety system of claim 11, wherein the controller is further configured to select between a plurality of deployment positions based on a characteristic of the pedestrian.

* * * * *